Jan. 11, 1955  G. W. AMES ET AL  2,699,133
ELECTRICAL ELEMENT MOUNTING JIG
Filed Jan. 25, 1952  3 Sheets-Sheet 1
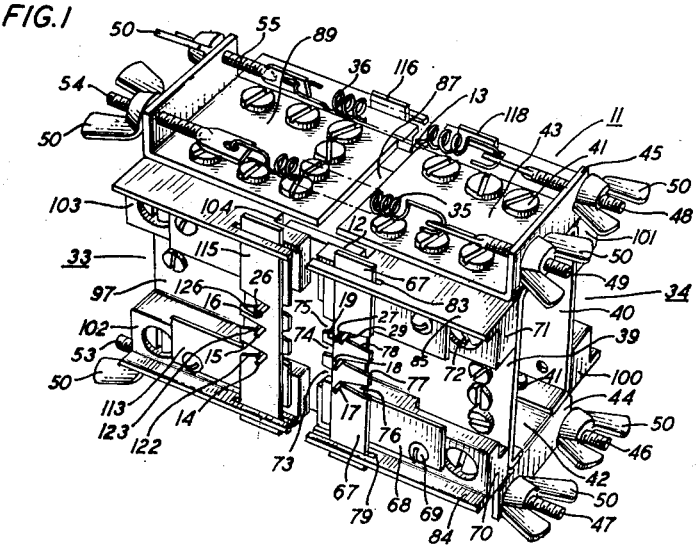
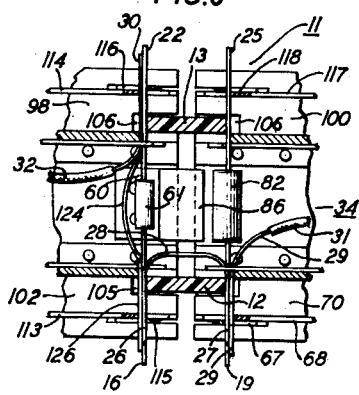
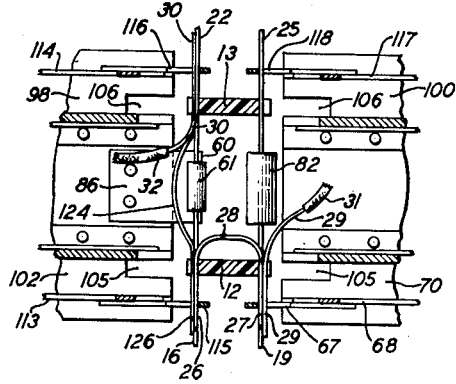
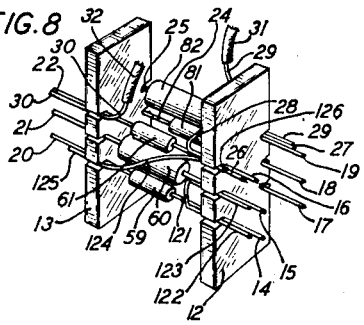
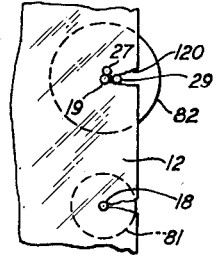
INVENTORS G.W. AMES
H.W. HERRINGTON
BY
ATTORNEY Jan. 11, 1955     G. W. AMES ET AL     2,699,133
ELECTRICAL ELEMENT MOUNTING JIG Filed Jan. 25, 1952     3 Sheets-Sheet 2

INVENTORS   G. W. AMES
               H. W. HERRINGTON
BY

ATTORNEY

Jan. 11, 1955 G. W. AMES ET AL 2,699,133
ELECTRICAL ELEMENT MOUNTING JIG
Filed Jan. 25, 1952 3 Sheets-Sheet 3

INVENTORS G.W. AMES
H.W. HERRINGTON
BY
ATTORNEY

United States Patent Office 2,699,133
Patented Jan. 11, 1955

2,699,133

ELECTRICAL ELEMENT MOUNTING JIG

George W. Ames, Cresskill, and Harold W. Herrington, Upper Montclair, N. J., assignors to Bell Telephone Laboratories, Incorporated, New York, N. Y., a corporation of New York Application January 25, 1952, Serial No. 268,188

2 Claims. (Cl. 113—99)

This invention relates to a method of and apparatus for mounting and connecting electrical elements.

An object of the invention is to provide an improved method of and apparatus for mounting electrical elements on insulating supports and connecting conductors to the electrical elements that will result in economy in the mounting and connecting of the electrical elements.

A feature of the invention resides in the method of securing portions of the electrical elements to the insulating supports.

Another feature resides in the method of connecting conductors to the electrical elements.

Another feature resides in a jig for holding the electrical elements, conductors and insulating supports in required positions during the mounting and connecting operation.

In the drawings:

Fig. 1 is a view in perspective of the jig with electrical elements, conductors and insulating supports supported therein in positions for subsequently accomplishing embedding of parts of the electrical elements in the insulating supports and connecting the conductors to the electrical elements;

Fig. 6 is a view, partly in section, of a portion of the apparatus shown in Fig. 2 and taken on the line 6—6 in that figure;

Fig. 7 is a view corresponding to Fig. 6 but with certain parts of the jig withdrawn from engagement with the insulating supports;

Fig. 8 is a view in perspective of an assembly of insulating supports and electrical elements with portions of the electrical elements embedded in the insulating supports in accordance with the present invention;

Fig. 9 is an enlarged view of a portion of one of the insulating supports with portions of electrical elements embedded therein, the electrical elements being shown partly in dash lines.

Figure 2:
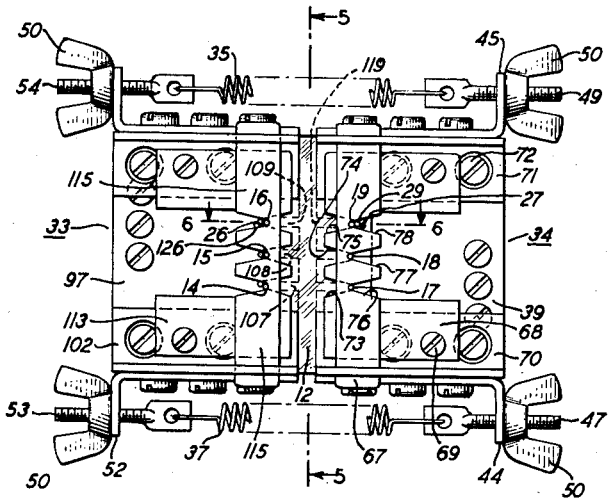
Fig. 2 is a front elevational view of the assembly of the jig, electrical elements and insulating supports shown in Fig. 1.

In electrical elements, such for instance as resistances and fixed condensers, it is often found advantageous to provide wire-type terminals on the ends of the electrical elements in order that the elements may be readily connected to terminals or wires of an electrical system. In attaching wires of the system to the terminals of the elements its is common practice to secure the circuit wires to the terminals by means of solder. In cases where a plurality of electrical elements are required in a system, spaced insulating strips are sometimes provided to serve as supports for the elements.

The present invention provides a method of and apparatus for simultaneously mounting the electrical elements on spaced insulating supports and securing required terminals of the elements to wires in the circuit.

In practicing the invention, thermoplastic insulating strips are provided as supports for the electrical elements and heat is applied to the terminals of the elements while the terminals and the thermoplastic strips are pressed together. The heat applied to the terminals is transmitted through the terminals to the thermoplastic strips. A jig is employed to hold the electrical elements, the insulating strips and wires in required position for mounting and connecting of the parts.

As shown in Fig. 1 of the drawings, a jig 11 is provided to hold thermoplastic insulating strips 12 and 13 in required position and terminals 14, 15, 16 and 17, 18, 19 relative to the thermoplastic strip 12. Other terminals 20, 21, 22 and terminals 23, 24, 25 are held relative to the thermoplastic strip 13. The jig 11, as shown in Fig. 6, also supports the ends 26 and 27 of a U-shaped jumper wire 28 against the thermoplastic strip 12. Bared ends 29 and 30 of respective conductor wires 31 and 32 are also supported in the jig 11, the bared end 29 being supported alongside 19 and 27 against the strip 12 and the bared end 30 being supported alongside terminal 22 and against the strip 13.

The jig 11 comprises two separable half portions 33 and 34 arranged in end-to-end relation and urged toward each other by springs 35, 36, 37 and 38. When the thermoplastic strips 12 and 13 and the terminals of electrical elements and the jumper wires and conductors are properly supported in the jig 11 and sufficient heat is applied to the terminals to appreciably soften edge portions of the thermoplastic strips 12 and 13, the terminals of the electrical elments and the other electrical conducting members supported in jig 11 will be urged into the edge portions of the thermoplastic strips 12 and 13 under the action of the springs 35, 36, 37 and 38. The heat required to soften the edge portions of the thermoplastic strips 12 and 13 can be applied to the terminals of the electrical elements supported in the jig 11, the heat being transmitted through the terminals to the engaged edge portions of the thermoplastic strips 12 and 13. Molten solder may be used to apply the required heat to the terminals and to other conducting parts to be electrically connected to each other and to be supported in the thermoplastic strips 12 and 13. The molten solder can be applied by dipping the required parts in molten solder contained in a vessel. For example, when the jig is loaded with the parts to be connected, one side of the jig or at least the parts projecting therefrom may be dipped in molten solder. The parts projecting from the other side of the jig may be treated in like manner simply by reversing the position of the jig and dipping the required parts in the molten solder. To prevent the solder from adhering to the jig 11, the entire jig 11 or some parts thereof may be made of material to which solder will not adhere. For example, if the solder employed will not adhere to aluminum the jig 11 or selected parts thereof may be made of aluminum.

Figure 4:
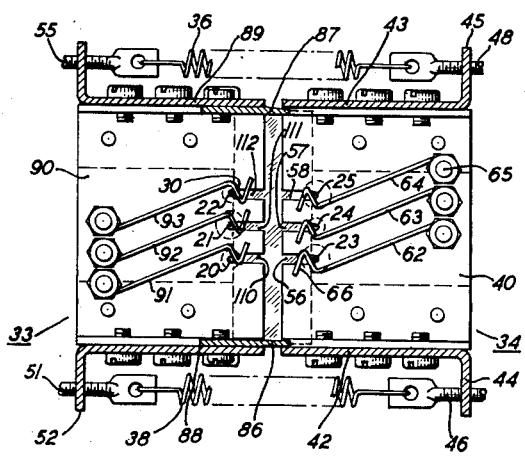
Fig. 4 is a view, partly in section, and taken on the line 4—4 in Fig. 3.

The two half portions 33 and 34 of jig 11 are constructed alike with one exception which will be subsequently pointed out. The half portions 33 and 34 are box-like structures comprising in each case and with reference to the half portion 34 shown in Fig. 1, two spaced and flanged upright side walls 39 and 40 secured by screws 41 or other suitable fastening means to a flanged lower wall 42 and a flanged upper wall 43. The flanges 44 and 45 of the respective walls 42 and 43 extend normal to the plane of the respective walls 42 and 43 and are apertured to accommodate eyelet-ended screws, the eyelet-ended screws 46 and 47 being supported in the flange 44 and the eyelet-ended screws 48 and 49 being supported in the flange 45. The eyelet-ended screws 46, 47, 48 and 49 are equipped with wing nuts 50 which are operable to cause or permit lengthwise movements of the screws 46, 47, 48 and 49. The screw 46 in the flange 44 as shown in Fig. 4 is in longitudinal alignment with a corresponding eyelet-ended screw 51 supported in the flange 52 of the half portion 33 of the jig 11, the flange 44 in the half portion 34 being in substantially parallel spaced relation with the flange 52 in the half portion 33 when the two halves of the jig 11 are properly assembled together. As shown in Fig. 2 a helical spring 37 is stretched between the screw 47 in the flange 44 and the corresponding eyelet-ended screw 53 in the flange 52, one end of the spring 37 being hooked into the eyelet end of screw 47 and the other end of the spring 37 being hooked into the eyelet end of screw 53. The pull of the spring 37 can be adjusted by suitably turning the wing nuts 50 on the screws 47 and 53. As shown in Fig. 4 a helical spring 38 is stretched between and attached to the eyelet ends of the screws 46 and 51 to cooperate with the spring 37 in urging the lower portions of the two halves of the jig 11 toward each other. The upper portions of the two halves of the jig 11 are urged toward each other by means of the helical springs 35 and 36, the spring 35 being stretched between and secured to the screws 49 and 54 and spring 36 being stretched between and secured to the eyelet ends of screws 48 and 55 as shown in Fig. 1.

Figure 3:
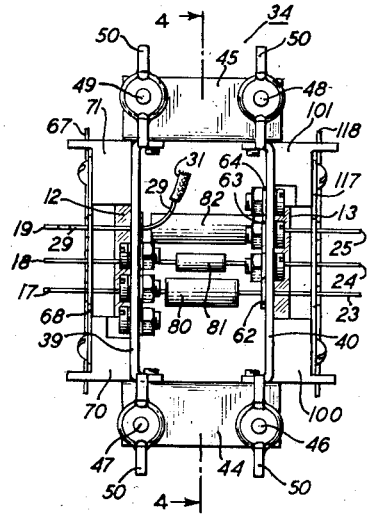
Fig. 3 is an end view of Fig. 2.
Figure 5:
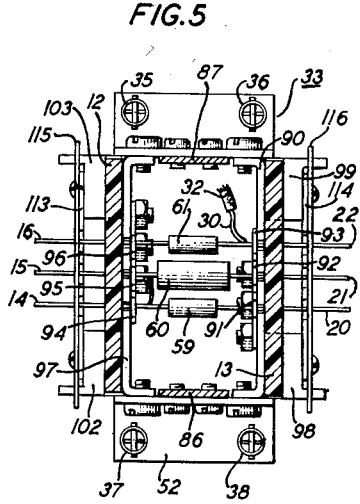
Fig. 5 is a view, partly in section, and taken on the line 5—5 in Fig. 2.
Figure 10:
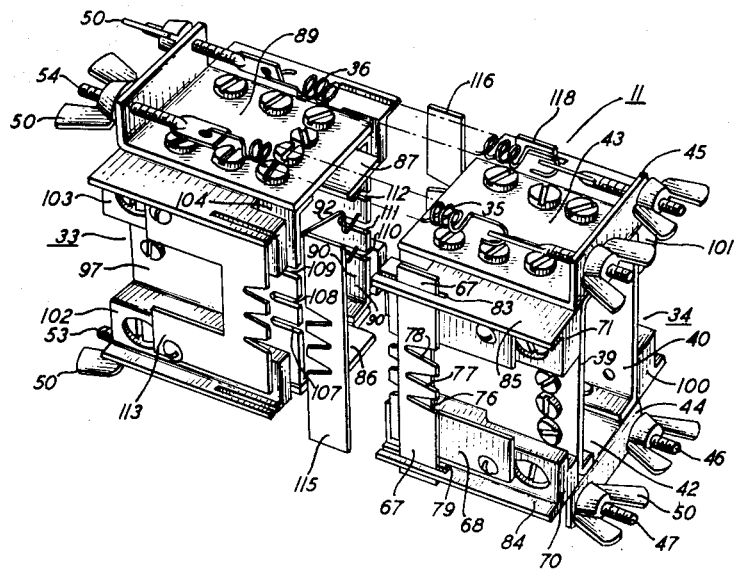
Fig. 10 is a view in perspective of the jig shown in Fig. 1 with the two half portions of the jig more widely separated and with no electrical elements or other parts supported therein.

Spaced slots 56, 57 and 58 are formed in the inner edge portion of each side wall 39 and 40 to accommodate the terminals of electrical elements, such for instance as terminals of the resistance elements 80, 81 and 82 shown in Fig. 3 or the terminals of the resistance elements 59, 60 and 61 shown in Fig. 5.

Spring latches 62, 63 and 64 as shown in Fig. 4 are provided to releasably hold the terminals of the electrical elements in place in the slots 56, 57 and 58. The spring latches 62, 63 and 64 are spring wire members, each being secured at one end to a side wall of the jig, in this case the wall 40 of a bolt 65. The free end of each spring latch terminates in a V-shaped portion 66 which extends across the base of one of the slots 56, 57 and 58 formed in the side wall 40. The spring latches 62, 63 and 64 are biased in the direction of one of the side walls of the associated slot and are in such positions that they will releasably hold terminals of the resistance elements and other wires inserted in the slots 56, 57 and 58 and latch the terminals and wires in the slots.

Straight combs 67 and U-shaped combs 68 are provided to cooperatively hold portions of the terminals of the electrical elements, jumper wires and other conductors together in required position for applying solder to the required parts. The U-shaped comb 68 is secured by screws 69 or other suitable fastening means to flanged spaced blocks 70 and 71 which are secured by screws 72 to the outer face of the side wall such as the side wall 39. The closed end of the U-shaped comb 68 has slots 73, 74 and 75 formed therein and facing inwardly of the jig 11. The straight comb 67 extends in parallel relation with the closed end of the U-shaped comb 68 and has slots 76, 77 and 78 formed therein corresponding to the slots 73, 74 and 75, respectively, but facing outwardly with respect to the jig 11. Ends of the straight comb 67 are frictionally and releasably held in slots 79 and 83 formed in the flanges 84 and 85 of the blocks 70 and 71, respectively. The comb 67 is applied to and positioned in the slots 79 and 83 after the terminals of the electrical elements, jumper wires and the bared ends of conductor wires are placed in the jig 11. The combs 67 and 68 should be made of material to which solder will not adhere and may be made, for instance, of aluminum. The flanged blocks 70 and 71 may also be made of aluminum.

It will be seen from Figs. 1 and 6 that the terminal 19 of an electrical element 82, the end 27 of a U-shaped jumper wire 28 and the bared end 29 of a conductor wire 31 are supported in the half portion 34 of jig 11 and that the terminal 19, the end portion 27 and a portion of the bared end 29 of the conductor wire 31 project outwardly beyond the outer surface of the comb 67. If molten solder is applied to the outwardly projecting portions of the terminal 19, the end 27 and the bared end 29, these portions of the terminal 19, the end 27 and the bared end 29 can be soldered together. The heat from the molten solder will be transmitted through these parts to an edge of the thermoplastic strip 12 to soften the engaged edge of the thermoplastic strip 12. When the edge portion of the thermoplastic strip 12 is sufficiently softened the pull of the springs 35 and 37 will cause the half portions 33 and 34 of the jig 11 to move closer together to press the terminal 19, the end 27 of the jumper wire 28 and the bared end of the conductor 29 of the conductor wire 31 into the softened edge of the thermoplastic strip 12. Some of the softened material in the edge portion of the thermoplastic strip 12 will close in over a portion of the terminal, the jumper wire and the bared end portion of the conductor wire and upon cooling will lock the terminal, the jumper wire and the conductor in required place in the thermoplastic strip 12.

The half portion 33 of the jig 11 is constructed like the half portion 34 but in addition thereto is provided as shown in Fig. 4 with guide plates 86 and 87. The guide plate 86 is secured to the inner surface of the lower wall 88 and projects therefrom a sufficient distance to lie against the inner surface of the lower wall 42 of the half portion 34 of the jig 11 when the jig 11 is assembled, as shown in Figs. 1, 2 and 4. The guide plate 87 as shown in Fig. 4 is secured to the inner surface of the upper wall 89 and projects therefrom a sufficient distance to lie against the inner surface of the upper wall 43 when the jig 11 is assembled as shown in Figs. 1, 2 and 4. The function of the guide plates 86 and 87 is to prevent undue upward or downward displacement of the half portion 33 relative to the half portion 34 when the two half portions are placed in cooperating position to form the jig 11.

In the half portion 33 of the jig 11 the side wall 90 follows the structure of the side wall 40 in the half portion 34 and is equipped with spring latches 91, 92 and 93 corresponding to the spring latches 62, 63 and 64 and there are corresponding spring latches 94, 95 and 96 on the side wall 97 as shown in Fig. 5. The side wall 90 is equipped with flanged blocks 98 and 99 corresponding to the flanged blocks 70 and 71 in the half portion 34 on the side wall 39 and the flanged blocks 100 and 101 on the side wall 40. The side wall 97 is equipped with flanged blocks 102 and 103 corresponding to the above-identified flanged blocks. The flanged blocks 70 and 102 are recessed to cooperatively accommodate the lower end of the thermoplastic strip 12 as shown at 105 in Fig. 6 in the same manner as the flanged blocks 71 and 103 are recessed to accommodate the upper end of the thermoplastic strip 12 as shown at 104 in Fig. 1. The flanged blocks 100 and 98 are recessed to accommodate the lower end of the thermoplastic strip 13 in the same manner as the flanged blocks 101 and 99 are recessed as shown at 106 in Fig. 6 to accommodate the upper end of the thermoplastic strip 13.

In using the jig 11 to produce the structure shown in Fig. 8, the electrical elements 59, 60 and 61 are placed in the half portion 33 of the jig 11 so that the terminals 14, 15 and 16 of the respective elements 59, 60 and 61 rest in the respective slots 107, 108 and 109 formed in the side wall 97. The opposite terminals 20, 21 and 22 of the electrical elements 59, 60 and 61 are placed in the respective slots 110, 111 and 112 of the side wall 90, the terminals in each case being latched into the slots by the spring latches on each side wall, such for instance as the spring latches 91, 92 and 93, the V-shaped free ends of which may be displaced sufficient to allow the terminals to completely enter the slots. The spring latches subsequently spring back to normal positions so that the V-shaped ends operate to releasably latch the terminals in the slots, as shown for example in Fig. 4. In this position outer ends of the terminals 14, 15 and 16 project through slots in a U-shaped comb 113 corresponding in structure to the U-shaped comb 68. The terminals 20, 21 and 22 project through the slots 110, 111 and 112, respectively, in the wall 90 and through corresponding slots in the U-shaped comb 114 which is secured to the flanged blocks 98 and 99. The bared end 30 of a conductor 32 is placed alongside the terminal 22 and in the slot 112 in the wall 90, so that the bared end 30 projects outwardly through and beyond the U-shaped comb 114. The end portion 26 of the jumper wire 28 is placed in the upper slot in the U-shaped comb 113 and alongside the terminal 16. The straight combs 115 and 116 corresponding in structure to the comb 67 are then placed in the jig in the position shown in Fig. 1 to aid in supporting the terminals, the jumper wire and conductor in the jig 11.

The electrical elements 80, 81 and 82 are placed in the half portion 34 of the jig 11 so that the terminals 17, 18 and 19 of the respective elements 80, 81 and 82 rest in slots in the wall 39, the opposite terminals 23, 24 and 25 of the electrical elements 80, 81 and 82 being placed in respective slots 56, 57 and 58 of the wall 40, the terminals in each case being latched into the slots by the spring latches on each side wall such for instance as the spring latches 62, 63 and 64, the V-shaped free ends of which may be displaced sufficient to allow the terminals to completely enter the slots. In this position outer ends of the terminals 17, 18 and 19 project through the respective slots 73, 74 and 75 of the U-shaped comb 68. The terminals 23, 24 and 25 project through the appropriate slots in the U-shaped comb 117 which is secured to the flanged blocks 100 and 101. The bared portion 29 of the conductor 31 should be placed alongside the terminal 19 and in the slots 119 and 75 of the wall 39 and the U-shaped comb 68, respectively. The end portion 27 of the jumper wire 28 should be placed in the slot 75 of the U-shaped comb 68 and alongside the terminal 19 and the bared portion 29 of the conductor 31. The straight comb 67 is finally applied as shown in Fig. 1 to hold outwardly projecting portions of the terminal 19, the portion 27 of the jumper wire 28 and the bared portion 29 of the conductor 31 together, the outer end portions of the terminal 19, the portion 27 of the jumper wire 28 and the outer end portion of the bared portion 29 of the conductor being extended outwardly of the comb 67 a sufficient distance to permit soldering of these portions together. The straight comb 118 which corresponds to the straight comb 67 is applied to the outwardly projecting portions of the terminals 23, 24 and 25 to cooperate with the U-shaped comb 117 in holding the terminals 23, 24 and 25 in required place and position.

Subsequent to the placing of the electrical elements in the jig 11 the thermoplastic insulating strips 12 and 13 are placed in the jig so that edge portions of strips 12 and 13 will bear against the terminals, the jumper wires and the conductors being alongside desired terminals. Tension of the springs 35, 36, 37 and 38 can be adjusted by suitable operation of the wing nuts 50 to strongly urge the two half portions 33 and 34 of the jig 11 toward each other. Under this condition if sufficient heat is applied to the terminals of the electrical elements, edge portions of the thermoplastic strips 12 and 13 in the vicinity of the terminals will be softened and the terminals of the electrical elements will be transversely thrust into the heat softened areas of the edge portions of the thermoplastic strips 12 and 13, portions of the jumper wires and conductors above mentioned being thrust along with the terminals into the heat softened portions of the thermoplastic strips 12 and 13. During the thrusting of the terminals into the edge portions of the strips 12 and 13, some of the softened thermoplastic material will flow in over portions of the terminals, the jumper wires and conductors as shown at 120 in Fig. 9. The required heat can be applied by dipping the outwardly projecting end portions of the terminals, the jumper wires and conductors in molten solder. In this case upon removal of the terminals, the jumper wires and conductors from the molten solder, softened areas of the thermoplastic material will harden and portions of the terminals, the jumper wires and conductors will be securely embedded in the thermoplastic strip 12 or 13. The jumper wires and conductors associated with the terminals will be electrically connected to the terminals by solder. The heat required might also be applied by the use of a hot air blast or a soldering copper or in any other manner found practicable without departing from the spirit of the invention.

When the terminals of the electrical elements and other conducting parts, such as the jumper wires 28 and conductors 31 and 32, have been secured in the edge portions of the strips 12 and 13, the assembled structure such as shown in Fig. 8 can be removed from the jig 11 by withdrawing the half portions 33 and 34 of the jig 11 away from each other a sufficient distance to permit the assembled structure to fall out of the jig 11. During the separation of the half portions 33 and 34 of the jig 11, the straight combs will be withdrawn from the jig and the spring latches will be operated by the terminals to release the terminals from the jig 11.

As shown clearly in Fig. 8 a U-shaped jumper wire 121 having end portions 122 and 123 is supported in the insulating strip 12, the end portions 122 and 123 of the jumper wire 121 being alongside and electrically connected to the terminals 14 and 15, respectively. A curved jumper wire 124 as shown in Fig. 8 extends from the terminal 20 of the element 59 to the terminal 16 of the element 61, one end 125 of the jumper wire 124 being supported in the insulating strip 13 and the other end 126 being supported in the insulating strip 12. The jumper wires 121 and 124 shown in Fig. 8 are illustrative of jumper wire connections that are sometimes provided in an assembled structure of the type shown in Fig. 8 and are provided therein by placing the jumper wires in the jig 11 in required positions before the thermoplastic strips are softened and the terminals are thrust into the edge portions of the strips.

What is claimed is:

1. A jig for mounting terminal equipped electrical elements and conductors in a thermoplastic support comprising a plurality of separable open-ended rectangular boxes arranged in end-to-end relation, two opposite side walls of each said box having a plurality of registering slots extending inwardly from their forward edges to support the terminals of said electrical elements and said conductors, releasable latches mounted on said side walls adjacent said slots and engageable with the terminals of said electrical elements and said conductors, the other two opposite side walls having slotted blocks secured to the inner surface thereof, said slots extending parallel to the first-mentioned side walls and arranged to support a thermoplastic member in position for engagement by the terminals of said electrical elements and said conductors, and springs mounted on said first-mentioned side walls arranged to resiliently press the open ends of said boxes together.

2. A jig for mounting terminal equipped electrical elements and conductors in thermoplastic supports comprising two separable open-ended rectangular boxes, arranged in end-to-end relation and operable for relative movement, two opposite side walls of each said box having a plurality of registering slots extending inwardly from their forward edges to receive and support the terminals of said electrical elements and said conductors, releasable spring latches mounted on said side walls adjacent said slots and engageable with the terminals of said electrical elements and said conductors, the other two opposite side walls having slotted blocks secured to the inner surface thereof, said slots extending parallel to the first-mentioned side walls and arranged to support a thermoplastic member in position for engagement by the terminals of said electrical elements and said conductors, comb-like members on said slotted blocks to support portions of the terminals of said electrical elements and said conductors extending through said slotted walls, and springs mounted on said first-mentioned side walls arranged to resiliently press the open ends of both said boxes together.

References Cited in the file of this patent

UNITED STATES PATENTS

| Number | Name | Date |
| --- | --- | --- |
| 1,456,506 | Leveridge | May 29, 1923 |
| 2,355,820 | Reimer | Aug. 15, 1944 |
| 2,393,780 | Johansson | Jan. 29, 1946 |
| 2,399,536 | Baum | Apr. 30, 1946 |
| 2,425,127 | Schafer | Aug. 25, 1947 |
| 2,494,137 | Martines | Jan. 10, 1950 |
| 2,507,780 | Gilbert | May 6, 1950 |